(12) United States Patent
Wolfer et al.

(10) Patent No.: US 7,472,600 B2
(45) Date of Patent: Jan. 6, 2009

(54) PRESSURE SENSOR

(75) Inventors: Peter Wolfer, Kleinandelfingen (CH); Reinhold Hess, Winterthur (CH); Michael Mueller, Attikon (CH); Claudio Cavalloni, Regensdorf (CH); Christoph Kern, Aspach (DE); Steffen Schott, Schwieberdingen (DE); Pavlo Saltikov, Waiblingen (DE); Thomas Ludwig, Gerlingen (DE); Juergen Krueger, Remseck (DE)

(73) Assignee: Kistler Holding AG, Winterthur (CH)

( * ) Notice: Subject to any disclaimer, the term of this patent is extended or adjusted under 35 U.S.C. 154(b) by 24 days.

(21) Appl. No.: 11/575,778

(22) PCT Filed: Sep. 6, 2005

(86) PCT No.: PCT/CH2005/000503

§ 371 (c)(1),
(2), (4) Date: Aug. 6, 2007

(87) PCT Pub. No.: WO2006/032152

PCT Pub. Date: Mar. 30, 2006

(65) Prior Publication Data

US 2007/0277617 A1 Dec. 6, 2007

(30) Foreign Application Priority Data

Sep. 22, 2004 (CH) ................................ 1562/04

(51) Int. Cl.
*G01L 9/00* (2006.01)
(52) U.S. Cl. .................. 73/723; 73/715; 73/744; 73/756; 361/283.1
(58) Field of Classification Search ........... 73/700–756; 361/283.1–283.4
See application file for complete search history.

(56) References Cited

U.S. PATENT DOCUMENTS 5,587,601 A * 12/1996 Kurtz .......................... 257/417
7,114,396 B2 * 10/2006 Oda et al. ...................... 73/715

FOREIGN PATENT DOCUMENTS

| JP | 59216028 | 12/1984 |
| JP | 62140038 | 6/1987 |

OTHER PUBLICATIONS

PCT International Search Report, WO2006/032152 A1 dated Feb. 12, 2005.

* cited by examiner

*Primary Examiner*—Andre J Allen
*Assistant Examiner*—Jermaine Jenkins
(74) *Attorney, Agent, or Firm*—Dority & Manning, P.A.

(57) ABSTRACT

The invention relates to a pressure sensor (1), comprising a housing (2), a housing element (3) which may be exposed to a pressure chamber (10), mounted on the housing (2) by means of a metallic membrane (5) and a measuring cell (4) which can indirectly measure a pressure acting on the housing element (3) and transmitted to the measuring cell (4) as a force resulting therefrom. According to the invention, said pressure sensor (1) comprises a housing element (3) embodied as a pin and projects out of the housing (2). The advantage of such an arrangement is only a small drilling to a pressure chamber (10) need be provided, in order to carry out a pressure measurement. The pin (3) need only be so long that the front end thereof, in the assembled state, approximately reaches the wall (11) of the pressure chamber (10).

19 Claims, 3 Drawing Sheets

Figure 2:
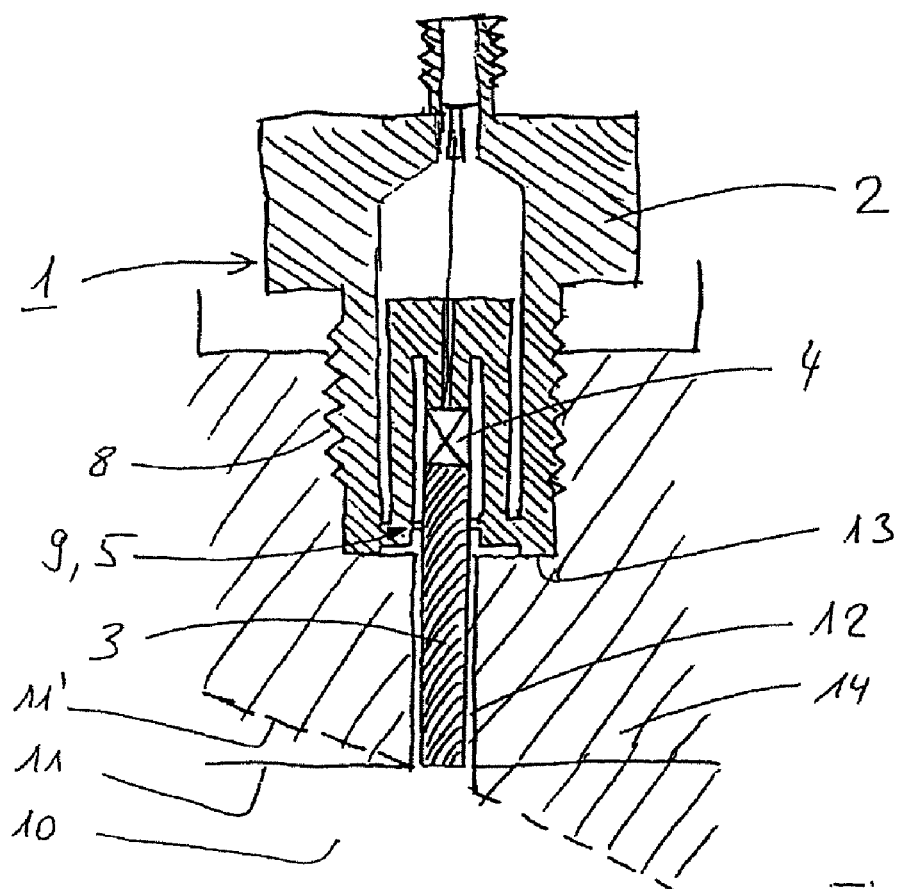
Figure 2:
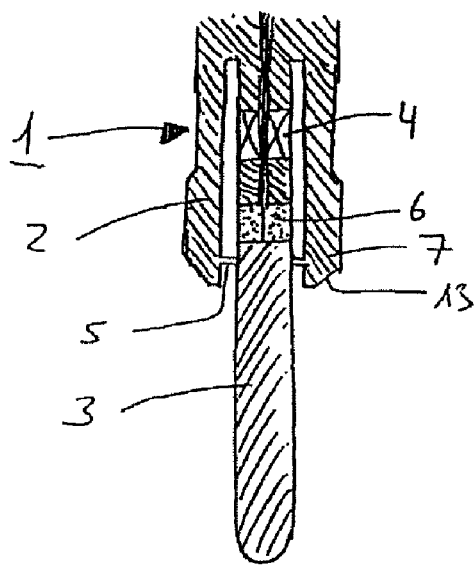
Figure 2:
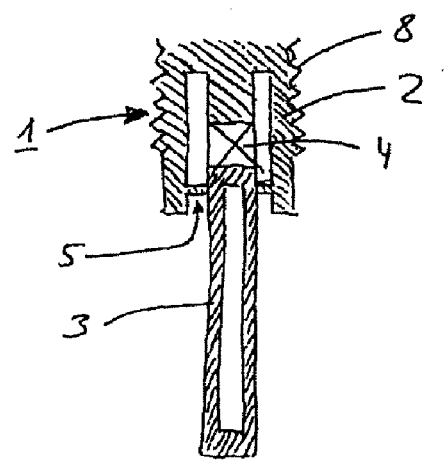

PRIOR ART
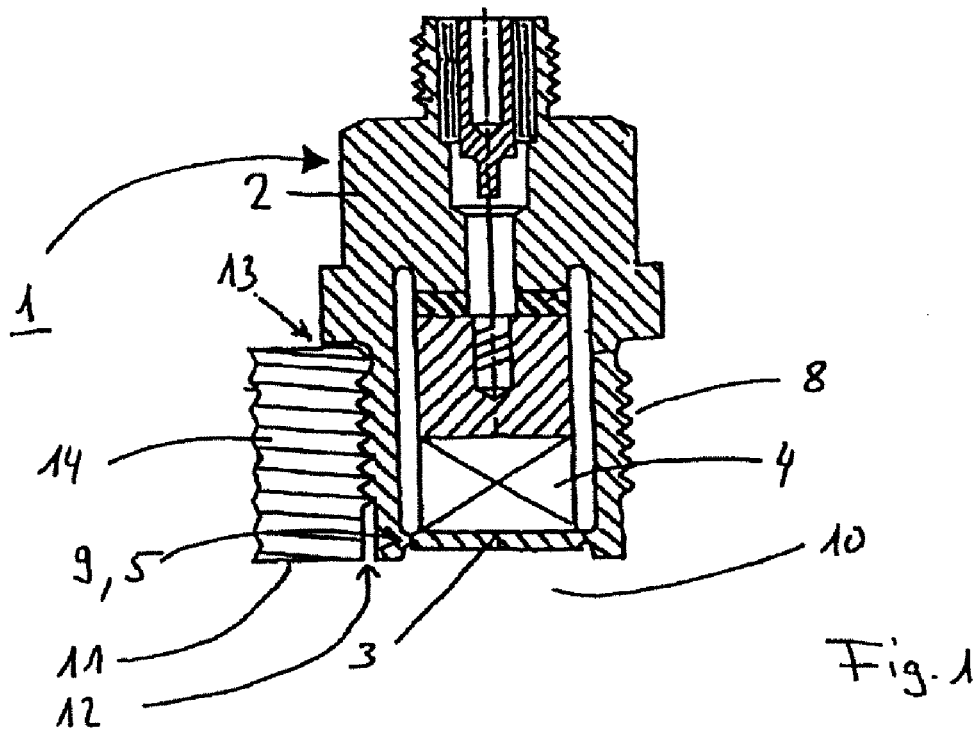
Fig. 1
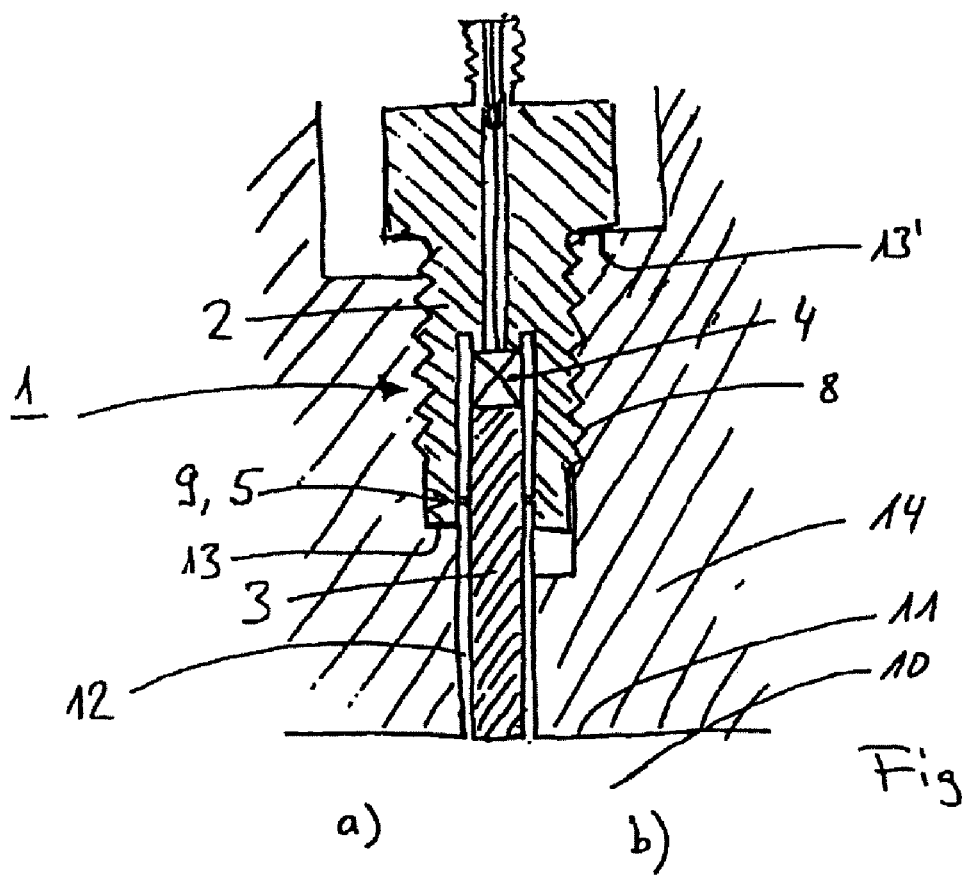
a)     b)
Fig. 2a,b

PRESSURE SENSOR

TECHNICAL FIELD

The invention relates to a pressure sensor that has a housing which may be mounted to the work piece (14) of a pressure chamber (10).

PRIOR ART

FIG. 1 shows a schematic representation of a pressure sensor 1 according to the prior art in cross section. Typically, it has a housing 2 and a measuring cell 4 with a housing element installed adjacently thereto which is able to transmit a pressure from a pressure chamber 10 onto the measuring cell 4. The housing element 3 which is typically a thin plate or membrane is welded to the housing 2 at a welding site 9 which on the one hand functions as a seal for the interior of the pressure sensor 1 with respect to the pressure chamber 10 and on the other hand ensures the mobility of the housing element 3. By means of a thread 8 the pressure sensor 1 can be installed in a mounting opening 12 provided therefor in a wall 11 of a work piece 14 so that the outer surface of the housing element 3 extends approximately continuously with the wall 11 of the pressure chamber 10. The sealing zone 13 of the pressure chamber 10 with respect to the housing 2 is for example in the area behind the thread 8.

Pressure sensors of the type mentioned in the beginning have been used since many years. For example, EP 0902267 describes a pressure sensor of this type. However, in many applications the pressure sensor is subjected to high temperatures so that a high-temperature insensitive measuring element must be used. In yet other examples it is impossible to produce a big drilling at a machine part that is big enough to mount a pressure sensor therein.

DESCRIPTION OF THE INVENTION

It is an object of the present invention to provide a pressure sensor which can also be installed in small drillings.

This object has been achieved by the features of the independent claim.

The idea underlying the invention is that the pressure sensor according to the invention includes a housing element embodied as a pin and protruding from the housing. The advantage of this arrangement is that only a small drilling to a pressure chamber need be provided to carry out a pressure measurement. The pin need only be so long that the front end thereof, in the assembled state, extends at least approximately to the wall of the pressure chamber. Particularly, the drilling provided for this purpose need not be perpendicular with respect to the wall of the pressure chamber. Another advantage of this arrangement is that the measuring cell is not immediately adjacent to the pressure chamber and thus need not inevitably be high-temperature resistant even if high temperatures dominate in the pressure chamber.

SHORT DESCRIPTION OF THE DRAWINGS

Figure 3:
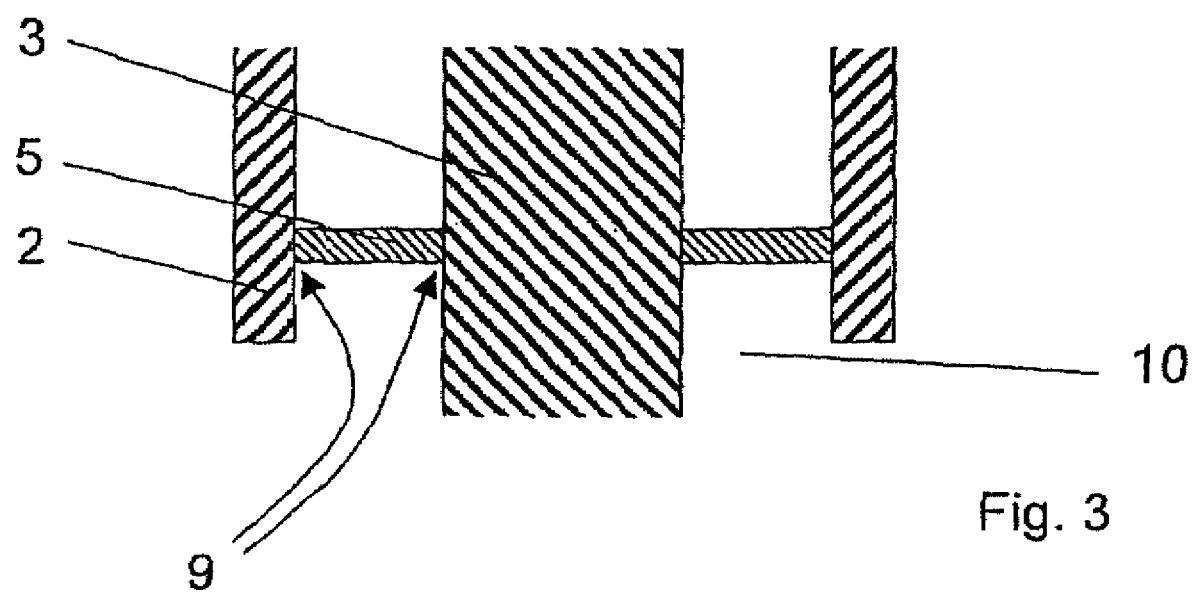

In the following the invention will be explained in more detail referring to the drawings. The designations are identical for all Figures. The Figures show FIG. 1 a schematic representation of a pressure sensor in cross section according to the prior art;

FIG. 2 a schematic representation of a pressure sensor according to the invention in cross section a) with front seal;
b) with shoulder seal;
c) with acceleration compensation (Antistrain);
d) with heater function;
e) with reduced pin mass;

FIG. 3 a partial view of a schematic representation of a pressure sensor according to the invention in the membrane area in cross section.

MODES FOR CARRYING OUT THE INVENTION

FIG. 2 shows different variations of a pressure sensor 1 according to the invention. This sensor also has a housing 2 and a measuring cell 4 as well as a housing element 3. The measuring cell 4 is arranged centrally in the pressure sensor 1. In contrast to the state of the art this housing element 3 is embodied in the form of a pin having a length which is at least twice, preferably four times its diameter. This pin 3 is also arranged centrally within the pressure sensor 1. Another difference as compared to the prior art is that the housing element 2 extends beyond the housing 2.

FIGS. 2a) and b) each of which are shown in one half of the same representation differ in the constructive solution of the sealing zone 13, 13' of the pressure chamber 10 with respect to the housing 2. This sealing zone 13, 13' can optionally be arranged in front of or behind the thread 8 so that during mounting of the pressure sensor 1 into a mounting opening 12 of a work piece 14 an area of the housing 2 can seal with a corresponding protrusion at the mounting opening 12.

The housing 2 as well as any other component of the pressure sensor with the exception of the housing element 3 in the mounted state do not reach the wall 11 of the work piece 14 to the pressure chamber 10 and therefore are not subjected to the high temperatures which may predominate therein. This is an advantage in particular for the measuring cell 4.

The mounting opening 12 in the wall 11 of the work piece 14 can, in the area extending right from the front to the pressure chamber 10, merely consist of a narrow drilling into which the housing element 3 can be fitted. Therefore the drilling need not be large enough to accommodate a pressure sensor 1. In this manner a pressure sensor 1 can be mounted into a cylinder head gasket, for example, which is known for being very thin.

The housing element 3 in the form of a pin must seal very well towards the interior of the pressure sensor 1. For this purpose a metallic membrane 5 is used which is mounted to the housing 2. This membrane 5 is embodied with an annular shape to form a ring membrane and is shown in FIG. 3 in an enlarged view. This ring membrane 5 encircles the housing element 3 towards the inside forming a seal towards the housing at its outer edge. Preferably, this membrane 4 is welded to the housing element 3 and/or to the housing 2 at a welding site. The membrane 5 is flexible enough to enable a motion of the housing element 3 occurring in use under a pressure load.

For use in a high-temperature region the membrane 5 should be made from a high-temperature resistant material, preferably from an alloy on the basis of nickel. Due to this material a membrane 5 of this type will have a high service life.

An advantage in this construction is that force shunts can be minimized by optimizing the ratios of the effective membrane surface (diameter) to the membrane thickness. Housing effects such as for example thermal extensions are decoupled by means of this annular membrane 5.

In this way the sensitivity of the pressure sensor 1 is increased. Due to the small force shunt also the mounting sensitivity becomes very small. Owing to the membrane seal, linearity and hysteresis are below 0.2%. The membrane 5 acts like a spring in the single-mass oscillator system. This system can be optimized to have a very small acceleration sensitivity.

Preferably, a piezoelectric measuring cell 4 is used as the measuring cell 4. A pressure in the pressure chamber 10 acts as a force onto the measuring cell 4 via the housing element 3. Therefore, in the arrangement according to the invention a force measuring cell is used as the measuring cell 4 whereby a pressure sensor 1 is obtained which measures indirectly.

In FIG. 2c an acceleration-compensating pressure sensor is used as the basis of the pressure sensor 1 according to the invention. Any pressure sensor designed for a special purpose can be used, of course. Many constructive alterations, particularly regarding mounting of the pressure sensor line or the choice of materials, are known and can be combined with the present invention.

The measuring cell 4 can be prestressed independently of the mounting situation. This is an advantage if the measuring cell 4 is to be built as a finished component into an existing housing of the pressure sensor 1.

It is an advantage in this construction that force shunts can be minimized due to the optimized ratios of the effective membrane surface (diameter) to membrane thickness. Housing effects such as for example thermal extensions are decoupled by this annular membrane 5.

Also shown in FIG. 2c) is the possibility to provide a mounting opening 12 which is inclined with respect to the wall 11 of the pressure chamber 10, i.e. which is not perpendicular thereto. This may be required if the work piece 14 is mounted together with other components for example with cooling or heating channels which must not be intersected. The pressure sensor 1 according to the invention is particularly suitable for measuring the pressures in injection moulding tools.

The pressure sensor 1 according to the invention can also be suitable to measure a pressure in a combustion chamber, in particular an engine combustion chamber, for example in a diesel engine. For this purpose, a pressure sensor 1 according to FIG. 2d) is preferably used. This pressure sensor 1 is integrated in a heater plug. In this case, the force-transmitting housing element 3 is a heater pin of the heater plug. This heater plug may also be a corresponding mock plug which cannot be heated. In particular, a compression member 6 can be arranged between the measuring cell 4 and the housing element 3 which transmits the force similarly to the housing element 3. Particularly, the sealing portion 7 at which the sealing zone 13 of the pressure chamber 10 is installed can be an element distinct from the housing 2. In this case, the membrane 5 is tightly sealed, preferably welded, to this sealing portion 7 as well so that the seal is still ensured.

FIG. 2e) shows another variation of a pressure sensor 1 according to the invention. In this embodiment the housing element 3 is embodied hollow to reduce the mass thereof. In this way, the natural frequency of the pin 3 is increased resulting in less disturbances during the measurements. The mass can also be reduced by using a light material, for example titanium, ceramic.

LIST OF REFERENCE NUMERALS 1 pressure sensor
2 housing
3 housing element, pin
4 measuring cell
5 membrane
6 compression element
7 sealing portion
8 thread
9 welding site
10 pressure chamber
11 11' wall of pressure chamber
12 mounting opening in the wall
13 13' sealing zone of pressure chamber
14 work piece

The invention claimed is:

1. A pressure sensor (1) for measuring the pressure within a pressure chamber (10) defined by a wall (11) of a work piece (14), the sensor (1) comprising:
   a housing (2) configured to be mounted to the wall (11) of the work piece (14),
   a metallic membrane (5) defined within the housing (2),
   a housing element (3) defining a pin extending slidably through said membrane (5) and having a first end disposed within the housing (2) and a second end which projects out of the housing (2) and is exposed to the pressure chamber (10) when the housing (2) is mounted to the wall (11) of the work piece (14), and
   a measuring cell (4) disposed within the housing (2) in a manner by which the cell (4) can indirectly measure a pressure acting on the first end of the housing element (3) and transmitted to the measuring cell (4) as a force resulting therefrom.

2. A pressure sensor according to claim 1, wherein the housing element (3) has a length which is at least twice its diameter.

3. A pressure sensor according to claim 1, wherein the measuring cell (4) is a piezoelectric measuring cell.

4. A pressure sensor according to claim 1, wherein the measuring cell (4) is a 25 force measuring cell.

5. A pressure sensor according to claim 1, wherein the measuring cell (4) is arranged centrally within the pressure sensor (1).

6. A pressure sensor according to claim 1, wherein the membrane (5) is welded to the pin (3).

7. A pressure sensor according to claim 1, wherein the membrane (5) is welded to the housing (2).

8. A pressure sensor according to claim 1, wherein the membrane (5) is welded to a sealing portion (7) forming a seal between the pressure chamber (10) and a mounting opening (12) provided in the wall (11) and configured to receive the pressure sensor (1).

9. A pressure sensor according to claim 1, wherein the measuring cell (4) is prestressed independently of the mounting state of the pressure sensor (1).

10. A pressure sensor according to claim 1, wherein the membrane (5) essentially has an annular shape.

11. A pressure sensor according to claim 1, wherein the membrane (5) is made of a high-temperature resistant material.

12. A pressure sensor according to claim 1, wherein the pressure sensor (1) is adapted to measure a pressure in a combustion chamber.

13. A pressure sensor according to claim 12, wherein the pressure sensor (1) is integrated in a heater plug.

14. A pressure sensor according to claim 1, wherein the pressure sensor (1) is adapted to measure the pressure in an injection moulding tool.

15. A pressure sensor according to claim 1, wherein the pressure sensor (1) is adapted to be built into a cylinder head gasket.

16. A pressure sensor according to claim 1, wherein the housing element (3) has a length which is at least four times its diameter.

17. A pressure sensor according to claim 1, wherein the membrane (5) is made of a high-temperature resistant alloy on the basis of nickel.

18. A pressure sensor according to claim 1, wherein the pressure sensor (1) is adapted to measure a pressure in a combustion chamber of an engine.

19. A pressure sensor according to claim 18, wherein the pressure sensor (1) is integrated in a heater plug.

* * * * *